United States Patent
Nakakubo et al.

[11] Patent Number: 5,709,625
[45] Date of Patent: Jan. 20, 1998

[54] HYDRAULIC TENSIONER

[75] Inventors: Katsuya Nakakubo; Sumio Watanabe, both of Saitama-ken, Japan

[73] Assignee: Tsubakimoto Chain Co., Osaka-fu, Japan

[21] Appl. No.: 641,080

[22] Filed: Apr. 26, 1996

[30] Foreign Application Priority Data

Apr. 28, 1995 [JP] Japan .................................. 7-127368

[51] Int. Cl.$^6$ .................................................. F16H 7/08
[52] U.S. Cl. ........................................ 474/110; 474/135
[58] Field of Search ............................. 474/110, 91, 101, 474/133, 135

[56] References Cited

U.S. PATENT DOCUMENTS

| | | | |
|---|---|---|---|
| 4,790,801 | 12/1988 | Schmidt et al. | 474/110 |
| 4,911,679 | 3/1990 | Inoue et al. | 474/110 |
| 5,073,149 | 12/1991 | Mauryama et al. | 474/110 |
| 5,383,813 | 1/1995 | Odai | 474/110 |

FOREIGN PATENT DOCUMENTS

| | | |
|---|---|---|
| 5-38442 | 5/1993 | Japan . |
| 7-6552 | 1/1995 | Japan . |

Primary Examiner—Roger J. Schoeppel
Attorney, Agent, or Firm—Dann, Dorfman, Herrell and Skillman; Henry H. Skillman

[57] ABSTRACT

A hydraulic tensioner 10 includes a hollow housing 14 having formed therewith an intermediate partition wall 12, a circular hollow cylinder 16 disposed concentrically in the housing 14, and a piston rod 18 slidably received in the cylinder 16 with a small gap or clearance therebetween. The cylinder 16 and the piston rod 18 jointly define therebetween a high pressure oil chamber 20. The pressure in the high pressure oil chamber 20 counteracts the force tending to retract the piston rod 18. The piston rod 18 projects from an open end of the housing 14, and a seal 24 surrounds the piston rod 18 to seal or close the end of the housing 14. The piston rod 18 has secured thereto a rod guide 28 disposed within the low pressure oil chamber 26. A spring 36 is disposed in a compressed condition between the housing 14 and the rod guide 28 to urge the piston rod 18 in the advancing direction. The rod guide 28 has radially elongated oil holes or passages 38 formed in its surface which engages the spring 36. The oil passages 38 extend radially outwardly from an inner peripheral surface of the rod guide 28 press fitted with the piston rod 18 and also extends axially through the rod guide 28, and are positioned so that they are not closed by the end of the spring.

4 Claims, 4 Drawing Sheets

HYDRAULIC TENSIONER

FIELD OF THE INVENTION

The present invention relates to a hydraulic tensioner used mainly for the adjustment of a tension on a timing belt of an automobile engine.

BACKGROUND OF THE INVENTION

A typical type of hydraulic tensioner is disclosed in Japanese Utility Model Laid-open Publication No. 7-6552. The tensioner of the disclosed type includes a hollow housing having at its one end an opening, a circular hollow cylinder disposed in the housing, and a piston rod slidable within the cylinder. In operation, a force tending to extend or advance the piston rod is exerted on the piston rod to keep the tension on a toothed belt or a chain (hereinafter simply referred to as "belt") at a constant value. The piston rod projects from the opening of the housing, and a seal is provided between the housing and the piston rod to close or seal an oil within the housing. The piston rod has secured thereto a rod guide, and a low pressure oil chamber defined within the housing is divided by the rod guide. A spring is disposed in a compressed or preloaded condition between the housing and the rod guide exerts a force on the piston rod to urge the piston rod in the advancing direction.

When the belt becomes slack, the piston rod advances whereupon an oil immediately flow from an oil reservoir in fluid communication with the low pressure oil chamber into a high pressure oil chamber defined within the cylinder so that a proper tension on the belt is immediately recovered. Conversely, when the belt is subjected to undue tension, the oil in the high pressure oil chamber gradually leaks out through the clearance between the cylinder and the piston rod, causing the piston rod to gradually retract to take up or absorb the undue tension on the belt.

In the conventional tensioner of the foregoing construction, when the piston rod advances, the oil-containing capacity is increased with the result that a negative pressure (gauge pressure) is formed within the housing. Under the effect of the negative pressure, air may be introduced or drawn into the housing through the interface between the piston rod and the seal. A rod guide is provided to avoid the occurrence of this phenomenon and, hence, has a function to maintain a seal side portion of the low pressure oil chamber at a positive pressure.

On the other hand, if an excessively high pressure is formed within the seal side portion of the low pressure oil chamber, leakage of oil would be caused. To avoid this problem, the rod guide is provided with an oil passage or hole for permitting flow communication of oil between the seal side portion and the cylinder side portion of the low pressure oil chamber to maintain the seal side portion of the lower pressure chamber at a proper positive pressure as the piston rod advances.

However, since the rod guide is held in abutment with a spring disposed in a compressed or preloaded condition, the oil passage is closed by end convolution of the spring and the end convolution thereby blocks the oil from flowing from the seal side portion to the cylinder side portion of the low pressure oil chamber. As a result, the pressure in the seal side portion of the low pressure oil chamber is elevated extraordinarily. Such an excessively high pressure tends to force the oil to leak out through the interface between the piston rod and the seal, on one hand, and hinders smooth advancing movement of the piston rod by the oil trapped in the seal side portion, on the other hand.

SUMMARY OF THE INVENTION

To solve the foregoing problems, the present invention provides a hydraulic tensioner including a housing having an open end, a piston rod projecting from the open end of the housing, a seal providing a tight seal between the housing and the piston rod to seal an oil or other hydraulic fluid within the housing, a rod guide secured to the piston rod and slidable along an inside wall of the housing, a spring disposed in a compressed condition between the housing and the rod guide to exert a force tending to advance the piston rod outward from the housing, the rod guide having an abutment surface held in abutment with an end convolution of the spring and, a radially elongated oil passage formed in the abutment surface, the oil passage not being closed by the spring.

DESCRIPTION OF THE PREFERRED EMBODIMENT

Figure 4:
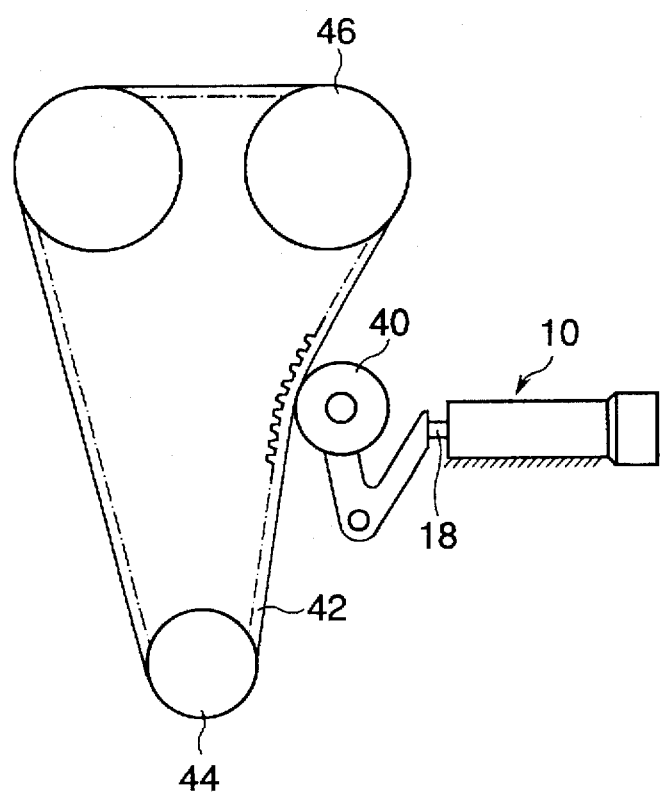
FIG. 4 is a diagrammatic view showing an installation of the tensioner.

With reference to FIG. 4, a tensioner 10 has a piston rod 18 operable to cause a pulley 40 to bear against the run of a belt 42 between adjacent toothed pulleys 44 and 46. When the belt becomes slack, the piston rod is advanced by the pressure of oil to restore a proper tension on the belt. In this instance, a rod guide 28 (see FIG. 1) is mounted on the rod 18 within a housing 14 which forms a low pressure chamber 26 for low pressure oil. The rod guide 28 advances together with the piston rod 18 towards a seal 24 which maintains the seal side portion of the low pressure oil chamber at a positive pressure (gauge pressure).

A radially elongated oil passage 38 is formed in the surface 39 of the rod guide, which abuts and engages the end convolution of a spring 36, and permits the passage of a constant quantity of oil through the passage 38 regardless of the position of engagement between the spring and the rod guide, so that the pressure in the seal side portion of the low pressure oil chamber can be maintained at a proper positive pressure, i.e. above the air pressure surrounding the housing 14. Thus, even when the piston rod is retracted away from the seal 24, the seal side portion of the low pressure oil chamber does not form a negative pressure, nor is it elevated to an extremely high pressure when the rod guide is advanced toward the seal. The piston rod can, therefore, be advanced smoothly without causing a leakage of oil.

Figure 1:
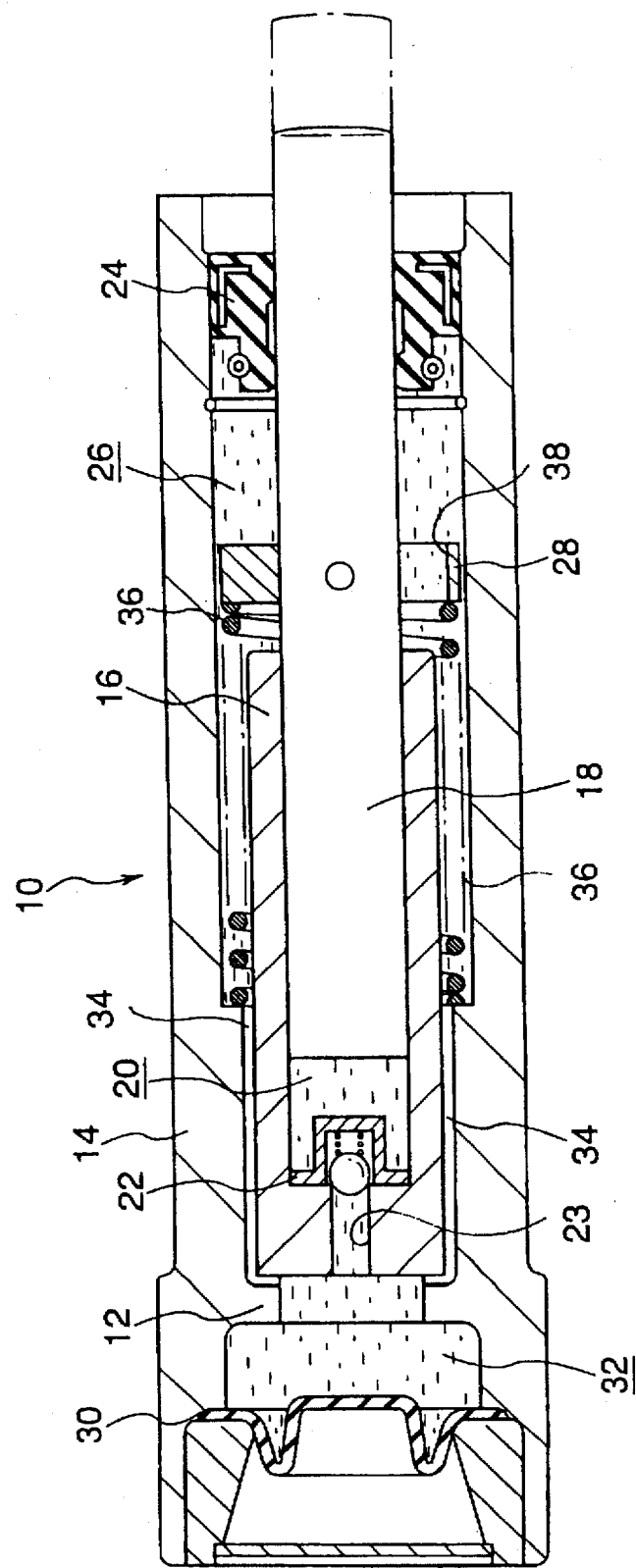
FIG. 1 is a cross-sectional view of a hydraulic tensioner according to the present invention.

As shown in FIG. 1, the hydraulic tensioner 10 according to the present invention includes a hollow housing 14 having formed therewith an intermediate partition wall 12, and a circular hollow cylinder 16 disposed concentrically in the housing 14. The piston rod 18 is slidably received in the cylinder 16 with a small gap or clearance therebetween. The cylinder 16 and the piston rod 18 jointly define therebetween a high pressure oil chamber 20. The high pressure oil chamber 20 communicates via a check valve 22 to the outside of the cylinder 16, and the pressure in the high pressure oil chamber 20 acts against the force tending to retract the piston rod 18. The check valve 22 has ball check which bears against a discharge port 23 in the end of the cylinder under the bias of a spring housed in a cage.

The piston rod 18 projects from an open end of the housing 14, and the seal 24 surrounds a projecting portion of the piston rod 18 to seal or close the open end of the housing 14. The seal 24 thus provided defines within the housing 14 the low pressure oil chamber 26 filled with oil. The piston rod 18 has secured thereto the rod guide 28 which is disposed within the low pressure oil chamber 26. The rod guide 28 is spaced from the inside wall of the cylinder 16 by a gap or clearance which is small enough to limit or restrict the flow of oil. As a result, when the piston rod 18 advances, the oil pressure in a seal side portion of the low pressure oil chamber 26 is kept at a positive pressure by the rod guide 28.

The housing 14 has an open end located on the rearward side of the intermediate partition wall 12, the opening end being closed by a diaphragm 30 so that wall 12 and the diaphragm 30, a oil reservoir 32. The oil reservoir 32 is held in fluid communication with the low pressure oil chamber 26 via grooves providing oil passages 38. The oil leaking out through a clearance between the cylinder 16 and the piston rod 18 may flow rearwardly into the oil reservoir 32 via the oil passages 34.

The spring 36 is disposed in a compressed or preloaded condition between the housing 14 and the surface 39 of the rod guide 28 and urges the piston rod 18 forwardly. Accordingly, when the belt 42 becomes slack, the piston rod 18 is advanced whereupon the oil in the oil reservoir 32 rapidly flows through the check valve 22 into the high pressure oil chamber 20 to immediately recover the proper tension on the belt, the diaphragm 30 allowing the chamber 20 to contract. Conversely, when the belt tension is increased to an excess extent, the check valve 22 is closed, and the oil in the high pressure oil chamber 20 must gradually leak out through the clearance between the cylinder 16 and the piston rod 18 in response to the retracting movement of the piston rod 18, thereby reducing the tension on the belt at a rate controlled by the clearance. The oil leaking into the chamber 26 may flow rearwardly through the grooves 34 to replenish the reservoir 32.

Figure 2:
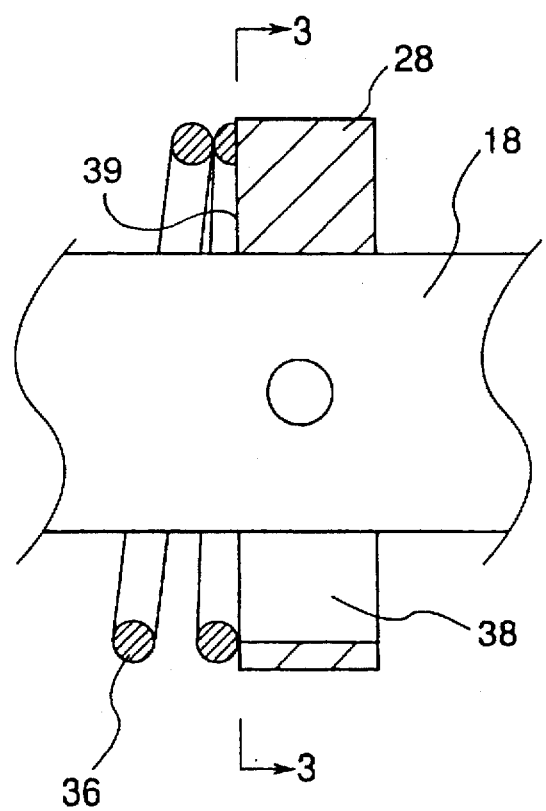
FIG. 2 is an enlarged cross-sectional view of a rod guide of the hydraulic tensioner shown in FIG. 1 with parts of the tensioner shown to illustrate the environment of rod guide.
Figure 3:
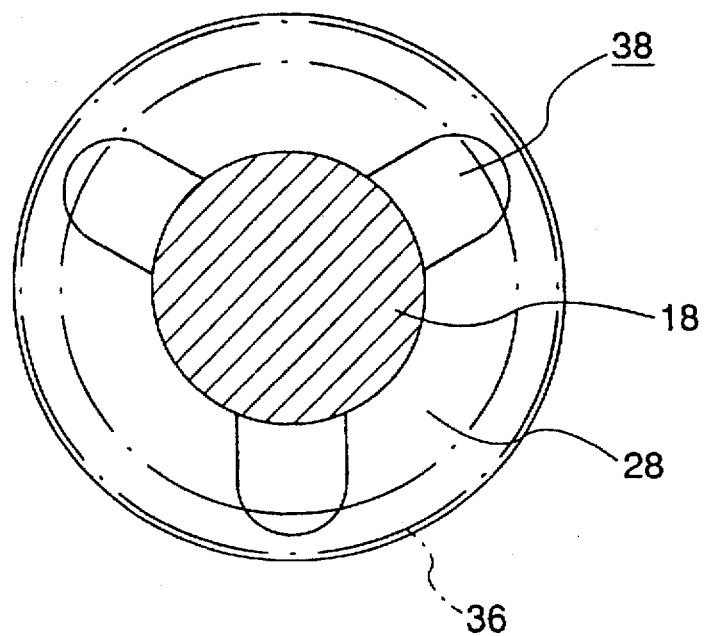
FIG. 3 is a cross-sectional view taken along the line 3—3 of FIG. 2.

The rod guide 28 of the tensioner according to this invention, as shown in FIGS. 2 and 3, has a plurality (three in the illustrated embodiment) of oil passages or holes 38. The oil passages 38 are elongated in the radial direction at least on the surface 39 of the rod guide 28 which is held in abutment with an end convolution of the spring 36. More specifically, as shown in FIG. 3, the oil passages 38 are in registry with the end convolution and extend radially outwardly from an inner peripheral surface of the rod guide 28 which is press-fitted with the piston rod 18 and also extend through the thickness of the rod guide 28 in the axial direction of the piston rod 18. In FIG. 3, the phantom lines designate a portion of the spring 36 engaged with the surface 39 of the rod guide 28. As shown in FIGS. 2 and 3, the oil passages 38 are not closed by the spring 36 but extend radially beyond the thickness of the end convolution of the spring so as to guarantee a sufficient flow of oil between the forward side (seal side) and the rearward sides (cylinder side) of the rod guide 28.

The rod guide 28 is preferably manufactured by sintering or press-forming and subsequently press-fitted with the piston rod 18. According to the illustrated embodiment, the rod guide 28 is provided with a plurality of oil passages or holes 38 elongated in the radial direction and extending through the rod guide 28 in the axial direction. The oil passages 38 are open at an inner peripheral surface of the rod guide 28. The oil passages 38 thus provided are able to absorb stresses created in the rod guide 28 during the press-fitting operation so that a deformation and a change in outside diameter of the rod guide 28 do not take place. Since there is a small gap or clearance between the rod guide 28 and the housing 14, the foregoing press-fitting operation which is achievable without the change in outside diameter of the rod guide 28 automatically obviates the need for a dimensional control of the rod guide 28 achieved, for example, by finish working of the outer peripheral surface of the rod guide 28. The rod guide 28 is smoothly slidable within the housing 14.

Although the number of the passages 38 shown in the illustrated embodiment is three, less than two or more than four oil passages may be employed according to the present invention. The oil passages 38 should by no means be limited to the shape and configuration shown in FIGS. 2 and 3 as long as they are not closed by the spring 36. They may have another shape and configuration, such as radially-elongated axial through-holes or passages extending from the outer peripheral surface toward the inner peripheral surface of the rod guide 28. Each of the oil passages may be composed of the combination of a radial recess extending radially in the engagement surface of the rod guide 28 held in abutment with the spring 36, and an axial through-hole extending continuously from the bottom of the radial recess through the thickness of the rod guide 28 and opening to a seal side portion of the low pressure oil chamber 26 adjacent to the seal 24. As a further alternative, the oil passages may be composed of a first radial oil passage (or passages) extending from the outer peripheral surface toward the inner peripheral surface of the rod guide 28, and a second radial oil passage (or passages) extending from the inner peripheral surface toward the outside peripheral surface of the rod guide and arranged alternately with the first radial oil passage (or passages). Such passages should have a part in registry with the end convolution of the spring.

According to the present invention, the rod guide 28 movable together with a piston rod 18 has radial oil passages or holes 38 formed in a spring retaining surface 39 held in abutment with a spring. The oil passages are, therefore, not closed by the spring regardless of the abutment position and size of the spring, and so the flow of oil passing through the flow passages is not subjected to undue restriction. When the piston rod advances, the flow of oil is restricted to such an extent that the seal side portion of the low pressure oil chamber is maintained at a proper pressure without forming a negative pressure or being elevated to an excessively high pressure. Thus, the low pressure oil chamber is protected against intrusion of the outside air and the leakage of oil.

Furthermore, the oil in the low pressure oil chamber is permitted to flow smoothly from the seal side portion to the cylinder side portion, and vice versa, via the oil passages 38 in the rod guide 28. Accordingly, when the belt 42 becomes slack, the piston rod 18 is able to start its advancing movement immediately to recover a proper belt tension without being obstructed by the oil in the seal side portion of the low pressure oil chamber. Thus, the tensioner has an improved degree of response.

While a particular embodiment of the present invention has been herein illustrated and described, it is not intended to limit the invention to such disclosures, but changes and modifications may be made therein and thereto within the scope of the following claims.

We claim:

1. A hydraulic tensioner including a cylindrical housing having an open end, a piston rod projecting axially from said open end of said housing, a seal providing a tight seal between said housing and said piston rod to seal an oil within said housing, a rod guide secured to said piston rod and slidable axially along an inside wall of said housing, and a spring disposed in a compressed condition between said housing and said rod guide to exert an axial force tending to advance said piston rod outward from said housing, characterized in that said spring is a coil spring and said rod guide has a surface held in abutment with an end convolution of said spring, said end convolution having a given radial thickness, and a radially elongated oil passage formed through said surface, said oil passage being in registry with said end convolution and extending radially beyond said given radial thickness so as to not be closed by said spring convolution.

2. For use with a belt having a run extending between spaced pulleys, a hydraulic tensioner having a housing, a piston rod extending axially from one end of said housing and terminating in means to engage said run to maintain tension therein, a seal to close said one end of the housing while affording axial displacement of said rod, the other end of the housing having a reservoir cooperating with said housing and seal to provide an elongated low-pressure chamber for oil, a rod guide on said piston rod and a compressed coil spring, having an end convolution at one end seated in said housing and an end convolution at the other end engaging said rod guide to bias said rod guide axially of said housing to urge said engaging means against the belt run, said other end convolution having a given radial thickness, said rod guide movable longitudinally in said low pressure chamber upon displacement of said piston rod, and oil flow passages through said rod guide in registry with said other end convolution to maintain the pressure of oil in said low pressure chamber above the air pressure surrounding said housing, said oil flow passages being radially elongated and extending beyond said radial thickness so as to be continuously open during axial displacement of said rod.

3. A hydraulic tensioner according to claim 2 including a hollow cylinder mounted in said housing coaxial with said piston rod between said rod guide and said reservoir, said cylinder slidably engaging the internal end of said piston rod to form a high pressure piston chamber within said hollow cylinder, said chamber having a check valve providing one-way communication from said reservoir into said chamber, said slidable engagement between said piston rod and said cylinder providing controlled communication from said piston chamber through said low pressure chamber to said reservoir upon axial displacement of said piston rod against the bias of said bias means, whereby oil in said piston chamber reinforces said bias resisting retraction of said piston rod.

4. A hydraulic tensioner according to claim 3 wherein said hollow cylinder is mounted in said housing and has an end wall confronting said reservoir, said housing having grooves extending from said low pressure chamber to said reservoir, said check valve being mounted in said end wall.

\* \* \* \* \*

UNITED STATES PATENT AND TRADEMARK OFFICE
CERTIFICATE OF CORRECTION

PATENT NO. : 5,709,625

DATED : January 20, 1998

INVENTOR : Katsuya Nakakubo et al.

It is certified that errors appear in the above-identified patent and that said Letters Patent is hereby corrected as shown below:

Column 3, line 18, after "so that" insert --there is defined, between the intermediate partition--

Signed and Sealed this

Twenty-first Day of April, 1998

Attest:

BRUCE LEHMAN

Attesting Officer

Commissioner of Patents and Trademarks